(12) United States Patent
Abadi et al.

(10) Patent No.: US 9,934,276 B2
(45) Date of Patent: Apr. 3, 2018

(54) SYSTEMS AND METHODS FOR FAULT TOLERANT, ADAPTIVE EXECUTION OF ARBITRARY QUERIES AT LOW LATENCY

(71) Applicant: TERADATA US, INC., Dayton, OH (US)

(72) Inventors: Daniel Abadi, New Haven, CT (US); Kamil Bajda-Pawlikowski, Cambridge, MA (US); Rebecca Schlussel, Teaneck, NJ (US); Philip Wickline, Winchester, MA (US)

(73) Assignee: Teradata US, Inc., Dayton, OH (US)

( * ) Notice: Subject to any disclaimer, the term of this patent is extended or adjusted under 35 U.S.C. 154(b) by 637 days.

(21) Appl. No.: 14/054,069

(22) Filed: Oct. 15, 2013

(65) Prior Publication Data

US 2014/0108861 A1    Apr. 17, 2014

Related U.S. Application Data

(60) Provisional application No. 61/713,714, filed on Oct. 15, 2012.

(51) Int. Cl.
  *G06F 17/30* (2006.01)
  *G06F 11/20* (2006.01)
  *G06F 9/50* (2006.01)

(52) U.S. Cl.
  CPC ...... *G06F 17/30463* (2013.01); *G06F 9/5066* (2013.01); *G06F 11/2028* (2013.01); *G06F 17/30445* (2013.01)

(58) Field of Classification Search
  None
  See application file for complete search history.

(56) References Cited

U.S. PATENT DOCUMENTS

| | | | |
|---|---|---|---|
| 7,984,043 B1* | 7/2011 | Waas | G06F 17/30932 707/718 |
| 8,825,701 B2* | 9/2014 | Ceri | G06F 17/30864 707/779 |
| 2007/0124303 A1* | 5/2007 | Dettinger | G06F 21/6227 |
| 2011/0302151 A1 | 12/2011 | Abadi et al. | |
| 2012/0137164 A1 | 5/2012 | Uhlig et al. | |

(Continued)

OTHER PUBLICATIONS

Grama, A., et al., (2003) "Introduction to Parallel Computing, Principles of Parallel Algorithm Design", Second Edition, Pearson Education Limited, pp. 85-147.

(Continued)

*Primary Examiner* — Belix M Ortiz Ditren
(74) *Attorney, Agent, or Firm* — Goodwin Procter LLP; Randy L. Campbell, Jr.

(57) ABSTRACT

A system and method for performing distributed execution of database queries includes a query server that receives a query to be executed on a database, forms a query plan based on the query, assigns tasks to task slots on a plurality of worker nodes in a cluster, and, upon receipt of a notification that a task has completed on a worker node, immediately assigns an unassigned task to a free task slot on that worker node, such that the task may begin executing on that worker node substantially immediately thereafter. The task slots on worker nodes include pools of resources that run tasks without start-up overhead.

40 Claims, 2 Drawing Sheets

(56) References Cited

U.S. PATENT DOCUMENTS

2013/0191843 A1\* 7/2013 Sarkar ................. G06F 9/5066
  718/105
2013/0290976 A1\* 10/2013 Cherkasova .......... G06F 9/5038
  718/104

OTHER PUBLICATIONS

International Search Report and Written Opinion for International Patent Application No. PCT/US2013/064978, dated Jul. 22, 2014, 16 pages.
Schill et al., (1990) "Distributed application support: Survey and synthesis of existing approaches", Information and Software Technology, Elsevier, vol. 32, No. 8, pp. 545-558.

\* cited by examiner

SYSTEMS AND METHODS FOR FAULT TOLERANT, ADAPTIVE EXECUTION OF ARBITRARY QUERIES AT LOW LATENCY

CROSS-REFERENCE TO RELATED APPLICATION

This application claims priority to and the benefit of U.S. Provisional Patent Application Ser. No. 61/713,714, filed Oct. 15, 2012, and entitled "System for Fault Tolerant, Adaptive Execution of Arbitrary Queries at Low Latency," the entirety of which is hereby incorporated by reference herein.

FIELD OF THE INVENTION

The invention relates generally to parallel data processing and, more particularly, to systems and methods for performing distributed execution of database queries on a plurality of worker nodes.

BACKGROUND

The amount of data that needs to be stored and processed is exploding. This is partly due to the increased automation with which data can be produced (more business processes are becoming digitized), the proliferation of sensors and data-producing devices, Web-scale interactions with customers, and government compliance demands along with strategic corporate initiatives requiring more historical data to be kept online for analysis. Today, many organizations need to load more than a terabyte of structured data per day into a data management system and have data warehouses more than a petabyte in size. This phenomenon is often referred to as "Big Data."

Today, the most scalable database management systems that are typically used to handle the "Big Data" flood use a "shared-nothing" architecture, where data is partitioned across a potentially large cluster of cheap, independent commodity servers that are connected over a network. Queries and data processing jobs are sent to a single server in the cluster (depending on the particular implementation, this is either a "master node" or an arbitrary server in the cluster) which are optimized (when queries are expressed in declarative languages like SQL, there is more flexibility in the optimization process), and a plan generated for how the different machines in the cluster can execute the query or job in parallel. This plan is then distributed to the participating machines in the cluster, each of which process part of the query/job according to the plan.

The systems described by the above paragraph are often called "parallel database systems" or "massive parallel processing (MPP) database systems". They achieve good performance by having each server involved in query processing running in parallel. This is typically achieved by leveraging the fact that data has been divided across the servers in advance of the processing. Therefore, each server can process the subset of the data that is stored locally. In some cases (such as filtering and local transformation operations), this processing can be done completely independently without the servers having to communicate. In other cases (such as aggregation and join operations), the servers need to communicate with each other over the network in order to complete the operation. In such a case, the optimizer that runs in advance of query/job execution makes an effort to create a plan that minimizes this network communication, since such communication can often become a bottleneck and limit the scalability of execution.

One important characteristic of these systems mentioned above is that planning and optimization is completed entirely in advance of query/job execution. This reduces the ability of such systems to adjust to unexpected events such as a server failure or server slow-down in the middle of query execution. In essence, these systems assume that failure is a rare enough event that queries and jobs can simply be restarted upon a server failure. Furthermore, they assume that it is possible to get homogenous or at least predictable performance across servers in the cluster, so that dynamic adjustment to "slowdown events" is unnecessary.

Unfortunately, while it is possible to get reasonably homogeneous or predictable performance across small numbers of machines (or "nodes"), it is nearly impossible to achieve this across hundreds or thousands of machines, even if each node runs on identical hardware or on an identically configured virtual machine. Part failures that do not cause complete node failure, but that result in degraded hardware performance, become more common at scale. Individual disk fragmentation and software configuration errors can also cause degraded performance on some nodes. Concurrent queries (or, in some cases, concurrent processes) further reduce the homogeneity of cluster performance. Furthermore, wild fluctuations in performance are common when running on virtual machines in cloud environments like Amazon EC2.

By doing query planning in advance, parallel database systems assign each node an amount of work to do based on the expected performance of that node. When running on small numbers of nodes, extreme outliers from expected performance are a rare event, and the lack of runtime task scheduling is not costly. At the scale of hundreds or thousands of nodes, extreme outliers are far more common, and query latency ends up being approximately equal to the time it takes these slow outliers to finish processing. Similarly, failures become statistically more common as the number of machines in the cluster increase, so the assumption that failures are a rare event becomes no longer valid.

Hence, as the size of the "Big Data" becomes larger, and more machines are needed in the shared-nothing cluster in order to process it, and parallel (MPP) database systems, using their current architecture, become increasingly poorly suited to handle these large scale processing tasks. One alternative is to use batch-processing systems such as Hadoop. While these systems are more fault tolerant and more adaptive than parallel database systems, their dynamic scheduling algorithms come at high overhead, leading to high job latencies (and hence the reputation of being "batch" systems rather than "real-time" systems).

Accordingly, what is needed is a parallel data processing system that combines fault tolerance, query adaptivity, and interactive query performance, and that overcomes the deficiencies of existing approaches.

SUMMARY

Described herein in various embodiments is a new parallel processing system that is highly fault tolerant and can adapt on-the-fly as unexpected events occur in the cluster. Unlike batch processing systems like Hadoop, the present invention does not incur high scheduling overhead, and is able to achieve "real-time" (sub-second) latencies for simple queries, and only slightly longer latencies for more complicated, multi-operator queries.

In one aspect, a system for performing distributed execution of database queries includes a query server having a memory and a processing unit for executing instructions stored on the memory. Execution of the instructions causes the processing unit to receive a query (e.g., in SQL) to be executed on a database and form a query plan based on the query. The database may include, for example, a table partitioned over a set of worker nodes. The query plan includes a plurality of operators divided into one or more tasks. Operators may include, e.g., scan, filter, sort, join, comparison, logical, and user-defined operators. The processing unit assigns tasks to task slots on worker nodes in a cluster. The task slots include pools of resources that run tasks without start-up overhead. Further, upon receipt of a notification that a task has completed on a worker node, an unassigned task is immediately assigned to a free task slot on that worker node, such that the task may begin executing on that worker node substantially immediately thereafter.

In one embodiment, the processing unit is operable to receive a task complete status update from a worker node upon completion of an assigned task on that worker node and, in response to the task complete status update, notify a worker node having an assigned task dependent on output of the completed task that the output may be retrieved from the worker node that completed the task.

In another embodiment, the processing unit is operable to maintain a list of task slots existing across worker nodes in the cluster. The list of task slots includes the status of each task slot. The status of each task slot may be busy, free, or blacklisted.

In one implementation, the processing unit is operable to maintain a list of tasks for the query plan. The list of tasks includes the status of each task. The status of each task may be completed, scheduled, or not yet scheduled.

In yet another embodiment, the same task is assigned to a free task slot on two or more different worker nodes, thereby causing the task to be redundantly executed.

In some embodiments, upon a determination that a worker node has failed, the failed node is blacklisted such that no further tasks are assigned to task slots on the failed node. Tasks previously assigned to task slots on the failed node may be reassigned to task slots on one or more other worker nodes.

In one embodiment, the query plan is an operator directed acyclic graph, with each operator in the graph representing a database operation to be performed on data input to that operator, and each parent operator in the graph dependent upon data produced by one or more child operators. Operators in the query plan may be divided into tasks, each for applying the operation associated with the operator to a disjoint subset of data from the database. Child tasks may have one or more parent tasks dependent on subsets of output data produced by the child task. Further, annotations may be associated with child tasks. The annotations include a mapping function for allocating the subsets of output data parent tasks.

In another aspect, a system includes a query server having a memory storing computer executable instructions. In the system, a method for performing distributed execution of database queries includes executing the instructions by a processing unit, resulting in the query server receiving a query (e.g., in SQL) to be executed on a database and forming a query plan based on the query. The database may include, for example, a table partitioned over a set of worker nodes. The query plan includes a plurality of operators divided into one or more tasks. Operators may include, e.g., scan, filter, sort, join, comparison, logical, and user-defined operators. Tasks are assigned to task slots on worker nodes in a cluster, The task slots include pools of resources that run tasks without start-up overhead. Further, upon receipt of a notification that a task has completed on a worker node, an unassigned task is immediately assigned to a free task slot on that worker node, such that the task may begin executing on that worker node substantially immediately thereafter.

In one embodiment, the query server receives a task complete status update from a worker node upon completion of an assigned task on that worker node and, in response to the task complete status update, notifies a worker node having an assigned task dependent on output of the completed task that the output may be retrieved from the worker node that completed the task.

In another embodiment, the query server maintains a list of task slots existing across worker nodes in the cluster. The list of task slots includes the status of each task slot. The status of each task slot may be busy, free, or blacklisted.

In one implementation, the query server maintains a list of tasks for the query plan. The list of tasks includes the status of each task. The status of each task may be completed, scheduled, or not yet scheduled.

In yet another embodiment, the query server assigns the same task to a free task slot on two or more different worker nodes, thereby causing the same task to be redundantly executed.

In some embodiments, the query server, upon determining that a worker node has failed, blacklists the failed node such that no further tasks are assigned to task slots on the failed node. The query server may reassign tasks previously assigned to task slots on the failed node to task slots on one or more other worker nodes.

In another aspect, a system for performing distributed execution of database queries includes a plurality of worker nodes. Each worker node includes a first memory storing at least a portion of a database, a second memory storing computer executable instructions, and a processing unit that, in executing the instructions, causes the worker node to receive, from a query server, an assignment of a task to be executed on a free task slot of the worker node. The task is assigned to the task slot by the query server and received by the worker node immediately after the task slot becomes available. The worker node further receives a notification, from the query server, that input required by a task assigned to a task slot of the worker node is available and, in response to the notification, retrieves the required input from a worker node that produced the required input.

In one embodiment, each worker node has a plurality of task slots, with each task slot including a pool of resources that runs tasks without start-up overhead. An assigned task on a worker node may retrieve required input from local storage on the worker node and/or storage on a different worker node. A worker node that completes a task may retain output created by the completed task until execution of a database query is completed.

In another aspect, a method for performing distributed execution of database queries includes receiving, from a query server, an assignment of a task to be executed on a free task slot of a worker node. The task is assigned to the task slot by the query server and received by the worker node immediately after the task slot becomes available. A notification is received, from the query server, that input required by a task assigned to a task slot of the worker node is available and, in response to the notification, the required input is retrieved from a worker node that produced the required input.

In one embodiment, each worker node has a plurality of task slots, with each task slot including a pool of resources that runs tasks without start-up overhead. An assigned task on a worker node may retrieve required input from local storage on the worker node and/or storage on a different worker node. A worker node that completes a task may retain output created by the completed task until execution of a database query is completed.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description, when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

1. System Architecture

Figure 1:
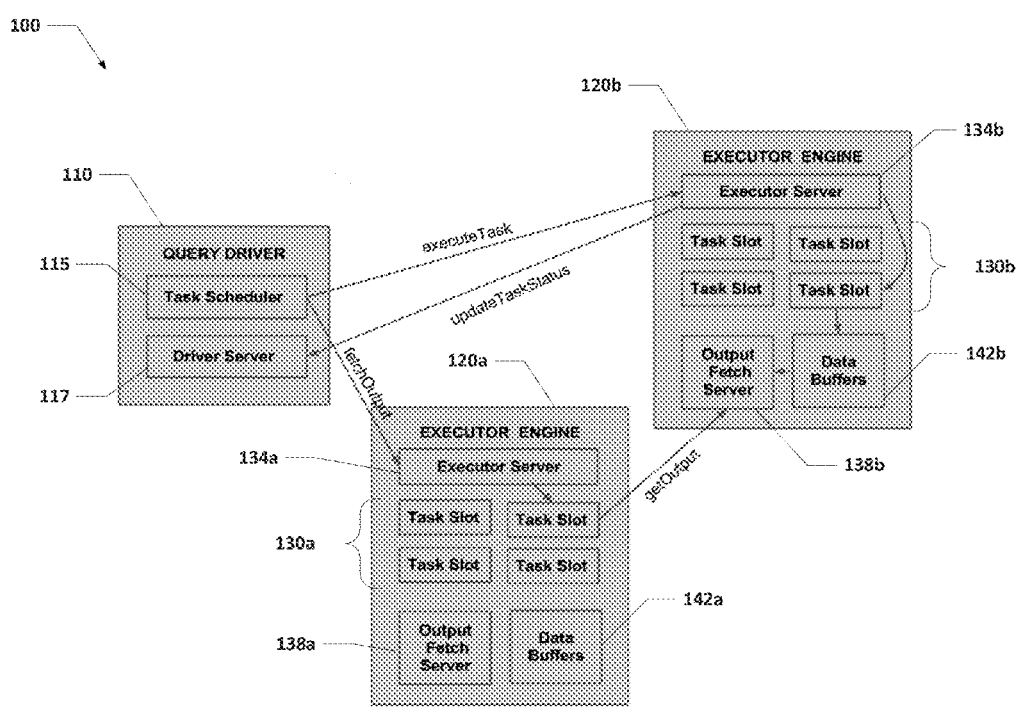
FIG. 1 is a diagram of a high-level system architecture according to an embodiment of the invention.

Referring to FIG. 1, in one embodiment the high-level architecture of the present system 100 includes the components described below.

1.1. Query Driver

The Query Driver 110 is a component that executes on a server in a cluster that includes a plurality of working nodes. The main function of the Query Driver 110 is twofold. First, it receives an input query and creates a query plan for that query. The query plan may be in the form of an operator directed acyclic graph (DAG). The operators may be any known operator; e.g., scan, filter, sort, join, comparison, and/or logical operators. In some embodiments, the operators include user-defined functions. Some or all of the operators in the query plan are then divided into a series of tasks that perform disjoint parts of that operation (e.g., on disjoint subsets of data). For example, a filter operator may be divided into a series of tasks, one or more for each partition that the data had been divided into before storing it (assuming, for example, that data is partitioned across a shared-nothing cluster of machines, and each machine contains 0 or more partitions). Each task may perform an identical filter on its own or a shared partition of the data, so that after all tasks have been performed, the filter operation has been applied to the entire data set.

Second, the Query Driver 110 coordinates the schedule and execution of tasks across the cluster. It may not perform any tasks or data computation itself, but instead may coordinate the data processing by communicating with one or more worker nodes located across the cluster and oversee the successful completion of query tasks. In order to do this, one embodiment of the Query Driver 110 has two subcomponents: the Task Scheduler 115 and Driver Server 117, described further below.

1.1.1. Task Scheduler

In some implementations, worker nodes contain task slots 130a, 130b that, as further discussed below, are dedicated resources that are capable of executing tasks. The Task Scheduler 115 inside the Query Driver 110 assigns the tasks for a query to these task slots 130a, 130b across the cluster. This assignment process may occur over the course of the query processing, with some assignment occurring at the beginning of query execution, and some occurring later, as slots become free. The Task Scheduler 115 may attempt to assign tasks to task slots 130a, 130b inside nodes that already contain the required input data in their local disks or memory; however, this is generally only possible for "leaf tasks" (tasks that are part of operators at the bottom of the query tree DAG). The Task Scheduler 115 uses the WorkerPool and TaskStatusMap data structures described below to perform the assignment.

1.1.2. Driver Server

In one embodiment, the Driver Server 117 listens for messages from worker nodes (e.g., task status updates) over the course of query processing, and initiates the appropriate response to these messages. The Driver Server 117 also contains a pool of "Notification Senders" that are responsible for passing notifications to scheduled tasks concerning the output of dependent tasks (previously performed tasks whose output will be used as input to the current task) that are ready to be transferred.

The Query Driver 110 may maintain two data structures to aid in task scheduling:

(1) a "WorkerPool," which is a list of all task slots 130a, 130b that exist across all worker nodes in the cluster, and the current status of these task slots 130a, 130b (busy, free, or blacklisted); and (2) a per-query "TaskStatusMap" that maintains the status of all tasks (completed, scheduled, or not yet scheduled) for a particular query.

1.2. Executor Engine

In one embodiment, the Executor Engine 120a, 120b is a software component that runs on all worker nodes in the cluster. There is typically one Executor Engine 120a, 120b per server (worker node) in the cluster, although there may be more than one if, for example, nodes are divided into multiple virtual machines. Each virtual machine may also be considered an individual worker node. For simplicity of presentation, FIG. 1 shows two Executor Engines 120a, 120b (on either two worker nodes or two virtual machines on a single worker node); however, it is to be appreciated that there may be more than one or two worker nodes in the cluster (e.g., tens, hundreds, thousands, or more). The Executor Engine 120a, 120b may include the following subcomponents.

1.2.1. Executor Server

In one implementation, each Executor Engine 120a, 120b includes an Executor Server 134a, 134b that provides a network communication interface and listens over the interface for messages sent to the Executor Engine 120a, 120b from the Query Driver 110. There are two basic messages that the Executor Engine 120a, 120b may receive:

(1) executeTask—informs the Executor Engine 120a, 120b of a task that has been assigned to one of its free task slots 130a, 130b; and (2) fetchNotification—this informs the Executor Engine 120a, 120b that input is ready for one of its running and/or assigned tasks (so that it can go and fetch the input).

1.2.2. Pool of Task Slots

In one embodiment, task slots 130a, 130b are preallocated pools of resources that are capable of running tasks without start-up overhead. Tasks receive input either from local storage, or by sending a "getOutput" remote procedure call to the Output Fetch Server 138a, 138b (described below) located on a different Executor Engine 120a, 120b.

1.2.3. Data Buffers

In one embodiment, outputs of tasks that have been completed by the Executor Engine 134a, 134b are held by data buffers 142a, 142b, which are in-memory buffers that are capable of swapping data to disk if there is not enough memory. Data buffers 142a, 142b may be implemented using a hash map with a composite key (queryId, taskId, bucketId) and value (list of rows).

1.2.4. Output Fetch Server

In one embodiment, the Output Fetch Server 138a, 138b awaits requests to download the output of tasks that completed within the Executor Engine 120a, 120b and that are stored in the data buffers 142a, 142b. These requests may come in the form of getOutput remote procedure calls from across the networked cluster.

2. Query Execution

Figure 2:
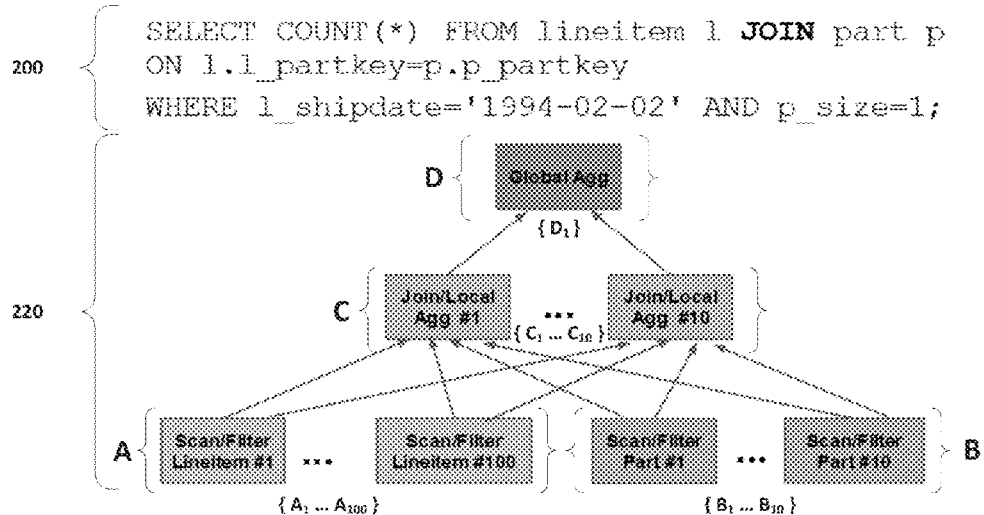
FIG. 2 is a diagram of an exemplary query task tree according to an embodiment of the invention.

In one embodiment, the Query Driver 110 receives a query or a job and produces a tree of operators that will execute the query. The operators are subdivided into tasks that perform the operation over a disjoint subset of the input to the operator. For example, FIG. 2 shows one example query 200 for operation on two database tables ("lineitem" and "part") and the resulting operator/task plan (or "query tree") 220 for that query 200. In this case, the input query 200 is described in a SQL-like language. Further, the "lineitem" table is divided into 100 partitions, and the "part" table is divided into 10 partitions.

Still referring to FIG. 2, there are four operators in this example: (A) scan the "lineitem" table while performing a filter (the filter is found in the WHERE clause; i.e., l_shipdate='1994-02-02'); (B) scan the "part" table and perform a different filter (the other part of the WHERE clause; i.e., p_size=1); (C) perform a join between the output of the two filters from A and B, and perform a local aggregation after performing the join (counting the number of join outputs); and (D) perform a global aggregation, summing all of the counts into a single global count.

Each of the above operators may be further divided into tasks. In this example, the "lineitem" scan/filter operator A is divided into 100 separate tasks $\{A_1 \ldots A_{100}\}$, one for each of the 100 partitions that the "lineitem" table was previously divided into. The "part" scan/filter operator B is divided into 10 separate tasks $\{B_1 \ldots B_{10}\}$, because the "part" table is a smaller table and was divided into fewer partitions. The join/local aggregation operator C is also divided into 10 tasks $\{C_1 \ldots C_{10}\}$, and the global aggregation operation D contains a single task $\{D_1\}$.

After the Query Driver 110 creates the above-described plan 220 of operators and tasks, the Query Driver 100 may label each task with parent, child, and type-specific properties. The "children" of a task are any tasks that provide input for that task. The children of "leaf operators" in the query tree 220 are partitions of the raw data sets that the query 200 accesses. The "parents" of a task are any tasks that need the output of that task as part of their input. For example, in the case where the operator DAG is in the form of a tree, the parents of a task are contained within the parent operator in the operator tree. Referring again to FIG. 2, each of the join tasks $\{C_1 \ldots C_{10}\}$ have the same single parent: the single global aggregation task $\{D_1\}$. However, the scan/filter tasks $\{A_1 \ldots A_{100}\}$, $\{B_1 \ldots B_{10}\}$ each have 10 parents (i.e., each of the 10 join tasks $\{C_1 \ldots C_{10}\}$ require at least some input from each of the scan/filter tasks). The parent of the root operator D in the task tree 220 is the Query Driver 110 which collects and serves the query results.

In the case where a task has multiple parents, but a different subset of the task output goes to each parent, the task may also be annotated with this information. In the example from FIG. 2, even though each scan/filter task $\{A_1 \ldots A_{10}\}$, $\{B_1 \ldots B_{10}\}$ has 10 different parents (the 10 join tasks $\{C_1 \ldots C_{10}\}$), any particular data item produced by a scan/filter task $\{A_1 \ldots A_{100}\}$, $\{B_1 \ldots B_{10}\}$ only serves as input for one particular join task parent $\{C_1 \ldots C_{10}\}$. A hash function (or other suitable method for task distribution) may be applied to each data item that is output from each scan/filter task $\{A_1 \ldots A_{100}\}$, $\{B_1 \ldots B_{10}\}$, and the result of this hash function determines which parent that that data item will serve as input for. The hash function and the mapping of the hash output to parent task is included in the task annotation associated with the respective task. The annotation may then be examined by the Executor Engine 134a, 134b when the task is run to create different data buffers 142a, 142b for each parent to which the task output will be sent.

In one embodiment, after the Query Driver 110 has completed the creation and annotation of the tasks, the Task Scheduler 115 assigns tasks to free task slots, continually updating the WorkerPool and TaskStatusMap based on the assignments. Of note, as part of the assignment process, the Task Scheduler 115 may immediately "push" assigned tasks to worker nodes by making a remote procedure call (RPC) to the executeTask procedure on the Executor Server 134a, 134b located in the Executor Engine 120a, 120b which contains the task slot that the task was assigned to. This allows the task to get started substantially immediately after the task is assigned, in contrast to "pull-based scheduling" (as found in prior batch processing systems), where tasks are not assigned until the machines that will execute them make explicit requests to a master node (e.g. a Job Scheduler) for tasks to process.

It is to be appreciated that the terms "immediately" and "substantially immediately" as used herein, may account for insubstantial delays associated with processing, delays associated with network communication, such as during the transmission of notifications and execution of remote procedure calls, and so on. For example, the process of assigning a task, notifying the worker node, and commencing the task may require several milliseconds to several seconds; however, this process may be considered to occur immediately or substantially immediately. One skilled in the art will recognize the various insubstantial delays that may occur in the present system.

Periodically over the course of task execution and/or once a task has completed execution, the Executor Server 134a, 134b located in the Executor Engine 120a, 120b which is running the task may make a call to the "updateTaskStatus" RPC located in the Driver Server 117 in the Query Driver 110 and send information about the current status of the task. The Query Driver 110 will update its local TaskStatusMap data structure based on the contents of this task status message.

In some implementations, if the task status update indicates that the task has completed, the Query Driver 110 will also update the WorkerPool data structure to indicate that a new free task slot exists, and will alert its Task Scheduler 115 so that a task can be assigned to the free slot. Furthermore, the Notification Senders inside the Query Driver 110 will look up the parent task(s) of the completed task and, if the parent task(s) have already been assigned by the Task Scheduler 115, a call to the "fetchOutput" RPC will be made to the Executor Server 134a, 134b located in the Executor Engine 120a, 120b that contains the task slot that the parent task was assigned to.

The fetchOutput RPC call informs the Executor Engine 120a, 120b that input is ready to be fetched for one of its tasks, and the Executor Engine 120a, 120b alerts the appropriate task, which can then make the getOutput RPC call to the appropriate Output Fetch Server 138a, 138b to retrieve its input data. As described above, data that has been outputted by a particular task remains in data buffers 142a, 142b, which the Output Fetch Server 138a, 138b reads to send this output data to the appropriate parent. The data buffers 142a, 142b may retain data even after it has been fetched from them because parent tasks may be rescheduled (as described below, this can happen because of a node failure or a slow node), and this allows the appropriate input data to be fetched again without having to re-perform the child task. This is important in a fault tolerant system that needs to minimize the amount of work that must be performed again as a result of a failure. To avoid re-performing work, the data stored in the data buffers 142a, 142b may be retained until the end of query execution, for a fixed period of time, or until additional space in the data buffers 142a, 142b is required for data produced by other tasks.

In one embodiment, the present system implements an adaptive scheduling approach. In particular, the completion of a task may cause an immediate update message to be sent to the Query Driver 110, which immediately assigns and pushes a new task to that newly free slot (if such a task is available). Faster nodes will generally finish tasks at a faster rate, and thus will have tasks assigned to them at a faster rate. Slower nodes will generally finish tasks at a slower rate, and will have tasks assigned to them at a slower rate. Therefore, even if a node is going unexpectedly slow, the system will dynamically adjust and give it less work to do relative to other nodes.

In some cases, a node is so slow that it is incapable of responding to RPC calls within a timeout period, its status updates indicate that no progress is being made, or it fails to send a status update within the requisite timeout period. The present system may address such cases similarly to the manner in which it addresses a failed node. The failure (or extreme slowness) of a node may be detected by either an Executor Engine 134a, 134b or by the Query Driver 110. An Executor Engine 134a, 134b might detect a problem if it sends the node an RPC call that results in a connection timeout. The Query Driver 110 might detect a problem if it does not receive a status update from the node, or the status update indicates that no progress is being made. In the former case, the Executor Engine 134a, 134b that detected the problem makes an RPC call to the Query Driver 110 to inform it of the problem. In the latter case, the Query Driver 110 itself is already aware of the problem. If the problem sustains past a threshold period, the Query Driver 110 may blacklist the problematic node. This prevents the Task Scheduler 115 from assigning any new tasks to that node. Furthermore, the Task Scheduler 115 reschedules the tasks that had already been scheduled on the problematic node to other available task slots 130a, 130b. Rescheduled tasks may include tasks that have previously completed successfully on the node if, e.g., the data buffers 142a, 142b that are no longer available on the node contain data that still need to be fetched by a downstream task.

3. Optimizations

The present system may optionally perform "speculative execution." If there exist more task slots 130a, 130b than tasks that need to be assigned, the Task Scheduler 115 may utilize these task slots 130a, 130b to redundantly execute tasks that are currently executing elsewhere, just in case the task will finish earlier in the new location. This helps eliminate "long tail" latencies caused by tasks running on slower nodes.

In another embodiment, the system may optimize performance using RPC batching. Two RPCs that are frequently called are the fetchOutput RPC (which is sent by one of the Notification Senders in a notification pool in the Query Driver 110 to the Executor Server 134a, 134b in the Executor Engine 120a, 120b of the parent task of a completed task), and the getOutput RPC (which is sent by the parent task to the Output Fetch Server 138a, 138b of node(s) on which child tasks were executed). If the system detects these RPCs are causing bottlenecks, they are batched together in order to reduce overhead.

4. Query Execution Examples

Described below are four examples of query execution in various embodiments of the system. Each example shows the execution of a SQL query, although the system is able to handle other types of query languages in addition to SQL.

(1) Scan query: SELECT * FROM nation

The query plan for this query is a simple scan operator for the "nation" table. If, for example, the "nation" table had been partitioned into X partitions ahead of time, this operator would be divided into X tasks, one for each partition. Since these tasks produce the final output, no other operator is needed in the query plan.

Referring back to FIG. 1, to execute this query, the Task Scheduler 115 on the Query Driver 110 assigns each task to task slots 130a, 130b located on Executor Engine 120a, 120b nodes that already have the corresponding partition stored in local storage. If no task slot 130a, 130b is free on any of the nodes that have this data stored locally, the scheduler may not immediately assign the task; rather it may wait until a local task slot 130a, 130b becomes free. Once the task is assigned, the task scheduler calls the executeTask RPC to reserve the appropriate slot 130a, 130b for that task and, if the RPC returns successfully, the task starts its execution inside its assigned slot 130a, 130b.

As each task runs, it stores its output inside data buffers 142a, 142b on the respective node. When a task completes (and periodically also before it completes), the task calls the updateTaskStatus RPC on the Query Driver 110 to inform it of its status. When the task completes, its results are fetched from the data buffers 142a, 142 on the executing node and served to the downstream application.

(2) Filter query: SELECT * FROM lineitem WHERE 1_shipdate='1994-02-02'

This query proceeds identically to the above example, except that the single operator performs a filter operation in addition to the scan. In this example, it is assumed that there is no index on 1_shipdate; otherwise, the system would perform an index scan instead of a table scan. Further, in other embodiments, the scan and filter processes may be considered separate operators and exist as separate tasks or task sets.

(3) Aggregation query: SELECT SUM (1_extendedprice) FROM lineitem WHERE 1_shipdate='1994-02-02'

This query results in a query plan having two operators. One operator performs a scan of the "lineitem" table (across the partitions of the table) and also performs a filter during the scan just as in the previous example. In addition, this operator extracts out the 1_extendedprice attribute of all data items that pass through the filter, and performs a running sum of these prices. There is one task per partition of the "lineitem" table for this operator. The second operator consists of a single task, and sums together all of the sums from the first operator.

The execution of tasks for the first operator proceeds similarly to the examples above, and the Query Driver 110 is notified when the task is complete. When the Query Driver 110 receives the notification that a task from the first operator (scan and filter) has completed, it may do one of two things. If the task for the second operator (the operator that performs the sum of sums) has already been assigned to a task slot 130*a*, 130*b* inside an Executor Engine 120*a*, 120*b*, then the Query Driver 110 may send a fetchOutput RPC call to the Executor Server 134*a*, 134*b* inside that Executor Engine 120*a*, 120*b*, informing it that some of its input is now ready to be fetched. However, if the task for the second operator has not yet been assigned, the Query Driver 110 may buffer the fetch notifications until the parent task is assigned and available for notifications.

When the sum aggregation task is informed that some or all the input it requires can be fetched, the task makes a getOutput RPC call to the Output Fetch Server 138*a*, 138*b* on which the data is available in order to retrieve the data. The task then performs the sum aggregation on the available input (eventually all required input), and stores the output in its respective data buffer 142*a*, 142*b* to be later fetched and served as the query result.

(4) Join query: SELECT COUNT(*) FROM lineitem JOIN part ON l_partkey=p_partkey WHERE l_shipdate='1994-02-02' AND p_size=1

This is the example query discussed in the main text above and depicted in FIG. 2. There is one operator for scanning and filtering the "lineitem" table, one operator for scanning and filtering the "part" table, one operator to perform the join and initial aggregation, and one operator to perform the global aggregation.

The join operator is partitioned into a number of tasks, where each task is responsible for joining a particular partition of the input. To enable each join task to be responsible for a part of the input, the output from each of its children operators is hashed into a number of unique buckets (where there is one bucket per join task) and each bucket is stored separately in a respective data buffer 142*a*, 14*b*. Each join task retrieves the output from the same bucket in all of its children. Once a join task has all of its inputs, it proceeds to the processing step and performs the join. After the join is performed, the rest of the query involves an aggregation which is performed just as described in Example 3, above.

One skilled in the art will recognize the various forms in which the systems and methods described herein may be implemented. Query Driver 110, Executor Engines 120*a*, 120*b*, and other components of the present system may be implemented in any suitable hardware or software. If implemented as software, components of the invention may execute on one or more server class computers that have sufficient memory, data storage, and processing power and that run a server class operating system (e.g., Oracle® Solaris®, GNU/Linux®, and the Microsoft® Windows® family of operating systems). The server class computer may be grouped in a cluster having one or more working nodes. The Query Driver 110 may execute on a separate server (virtual or physical) in the cluster, or it may execute on a server that also operates as a working node.

The invention also be practiced in distributed computing environments where tasks are performed by remote processing devices that are linked through a communications network. In a distributed computing environment, program modules may be located in both local and remote computer storage media including memory storage devices. Other types of system hardware and software than that described herein may also be used, depending on the capacity of the device and the amount of required data processing capability. The invention may also be implemented on one or more virtual machines executing virtualized operating systems such as those mentioned above, and that operate on one or more computers having hardware such as that described herein.

A communications network may connect the computing devices with each other. The communication may take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network may carry TCP/IP protocol communications, and HTTP/HTTPS requests made by a web browser, and the connection between the clients and servers can be communicated over such TCP/IP networks. The type of network is not a limitation, however, and any suitable network may be used.

Local and/or remote software may be implemented on hardware such as a smart or dumb terminal, network computer, workstation, minicomputer, mainframe computer, server, personal digital assistant, wireless device, smartphone, tablet, television, gaming device, music player, mobile telephone, laptop, palmtop, wireless telephone, information appliance, or other computing device, that is operated as a general purpose computer or a special purpose hardware device that can execute the functionality described herein. The software may be implemented on a general purpose computing device in the form of a computer including a processing unit, a system memory, and a system bus that couples various system components including the system memory to the processing unit.

The described systems may include a plurality of software processing modules stored in a memory and executed on a processor in the manner described herein. The program modules may be in the form of any or more suitable programming languages, which are converted to machine language or object code to allow the processor or processors to read the instructions. The software may be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories may store data in various forms and/or instructions that, when executed by a processor, form the modules, engines, and other components described herein and perform the functionality associated with the therewith. The processor and the memory can be supplemented by, or incorporated in special purpose logic circuitry.

In some cases, relational (or other structured) databases may provide such functionality, for example, as a database management system which stores any form of data for processing. Examples of databases include the MySQL Database Server or ORACLE Database Server offered by ORACLE Corp. of Redwood Shores, Calif., the PostgreSQL Database Server by the PostgreSQL Global Development Group of Berkeley, Calif., or the DB2 Database Server offered by IBM.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs may be implemented in any programming language. The software programs may be further translated into machine language or virtual machine instructions and stored in a program file in that form. The program file may then be stored on or in one or more of the articles of manufacture.

Although internal components of the computer are not shown, those of ordinary skill in the art will appreciate that such components and the interconnections are well known. Accordingly, additional details concerning the internal construction of the computers need not be disclosed in connection with the present invention.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Various aspects and features of the various embodiments of the invention may be used in various combinations and permutations and all such variants are considered to be within the scope of the invention.

The invention claimed is:

1. A system for performing distributed execution of database queries, the system comprising:
a query server comprising at least one memory storing computer executable instructions and at least one processing unit for executing the instructions, wherein execution of the instructions causes the at least one processing unit to:
receive a query to be executed on a database;
form a query plan based on the query, the query plan comprising a plurality of operators, each operator divided into one or more tasks;
assign tasks to task slots on a plurality of worker nodes in a cluster, wherein the task slots comprise pools of resources that run tasks without start-up overhead; and
upon receipt of a notification that a task has completed on a worker node, immediately assign an unassigned task to a free task slot on that worker node, such that the task may begin executing on that worker node substantially immediately thereafter, wherein a respective assignment rate for each worker node is selectively adjusted based on a rate at which each worker node completes assigned tasks.

2. The system of claim 1, wherein the database comprises at least one table partitioned over the plurality of worker nodes.

3. The system of claim 1, wherein execution of the instructions further causes the at least one processing unit to:
receive a task complete status update from a worker node upon completion of an assigned task on that worker node; and
in response to the task complete status update, notify a worker node having an assigned task dependent on output of the completed task that the output is available for retrieval from the worker node that completed the task.

4. The system of claim 1, wherein execution of the instructions further causes the at least one processing unit to maintain a list of task slots existing across worker nodes in the cluster, the list of task slots comprising the status of each task slot.

5. The system of claim 4, wherein the status ask slot is selected from the group consisting of busy, free, and blacklisted.

6. The system of claim 1, wherein execution of the instructions further causes the at least one processing unit to maintain a list of tasks for the query plan, the list of tasks comprising the status of each task.

7. The system of claim 6, wherein the status of each task is selected from the group consisting of completed, scheduled, and not yet scheduled.

8. The system of claim 1, wherein execution of the instructions further causes the at least one processing unit to assign a same task to a free task slot on two or more different worker nodes, thereby causing the same task to be redundantly executed.

9. The system of claim 1, wherein execution of the instructions further causes the at least one processing unit to, upon a determination that a worker node has failed, blacklist the failed node such that no further tasks are assigned to task slots on the failed node.

10. The system of claim 9, wherein execution of the instructions further causes the at least one processing unit to reassign tasks previously assigned to task slots on the failed node to task slots on one or more other worker nodes.

11. The system of claim 1, wherein the query comprises SQL.

12. The system of claim 1, wherein the query plan comprises an operator directed acyclic graph, wherein each operator in the graph comprises a database operation to be performed on data input to that operator, and wherein each parent operator in the graph is dependent upon data produced by one or more child operators.

13. The system of claim 12, wherein execution of the instructions further causes the at least one processing unit to divide an operator in the query plan into a plurality of tasks, each task for applying the operation associated with the operator to a disjoint subset of data from the database.

14. The system of claim 13, wherein at least one of the tasks is a child task having at least one parent task dependent on subsets of output data produced by the child task.

15. The system of claim 14, wherein execution of the instructions further causes the at least one processing unit to associate annotations with the child task, the annotations comprising a mapping function for allocating the subsets of output data to the at least one parent task.

16. The system of claim 12, wherein the operators comprise one or more of scan, filter, sort, join, comparison, logical, and user-defined operators.

17. A system for performing distributed execution of database queries, the system comprising:
   a plurality of worker nodes, each worker node comprising:
   a first memory storing at least a portion of a database;
   a second memory storing computer executable instructions; and
   at least one processing unit for executing the instructions, wherein execution of the instructions causes each worker node to:
   receive, from a query server, an assignment of a task from a plurality of tasks commonly associated with a database query to be executed on a free task slot of the worker node, wherein the task is assigned to the task slot by the query server and received by the worker node immediately after the task slot becomes available, wherein a respective assignment rate for each worker node is selectively adjusted based on a rate at which each worker node completes assigned tasks;
   receive a notification, from the query server, that input required by a task assigned to a task slot of the worker node is available; and
   in response to the notification, retrieve the required input from a worker node that produced the required input.

18. The system of claim 17, wherein each worker node comprises a plurality of task slots, each task slot comprising a pool of resources that runs tasks without start-up overhead.

19. The system of claim 17, wherein an assigned task on a worker node retrieves required input from one of local storage on the worker node and storage on a different worker node.

20. The system of claim 17, wherein a worker node completing a task retains output created by the completed task until execution of the database query is completed.

21. In a system comprising a query server having at least one memory storing computer executable instructions, a method for performing distributed execution of database queries, the method comprising:
   executing the instructions by at least one processing unit, the execution of the instructions resulting in the query server performing the steps of:
   receiving a query to be executed on a database;
   forming a query plan based on the query, the query plan comprising a plurality of operators, each operator divided into one or more tasks;
   assigning tasks to task slots on a plurality of worker nodes in a cluster, wherein the task slots comprise pools of resources that run tasks without start-up overhead; and
   upon receiving a notification that a task has completed on a worker node, immediately assigning an unassigned task to a free task slot on that worker node, such that the task may begin executing on that worker node substantially immediately thereafter, wherein a respective assignment rate for each worker node is selectively adjusted based on a rate at which each worker node completes assigned tasks.

22. The method of claim 21, wherein the database comprises at least one table partitioned over the plurality of worker nodes.

23. The method of claim 21, wherein the execution of the instructions further results in the query server performing the steps of:
   receiving a task complete status update from a worker node upon completion of an assigned task on that worker node; and
   in response to the task complete status update, notifying a worker node having an assigned task dependent on output of the completed task that the output is available for retrieval from the worker node that completed the task.

24. The method of claim 21, wherein the execution of the instructions further results in the query server performing the step of maintaining a list of task slots existing across worker nodes in the cluster, the list of task slots comprising the status of each task slot.

25. The method of claim 24, wherein the status of each task slot is selected from the group consisting of busy, free, and blacklisted.

26. The method of claim 21, wherein the execution of the instructions further results in the query server performing the step of maintaining a list of tasks for the query plan, the list of tasks comprising the status of each task.

27. The method of claim 26, wherein the status of each task is selected from the group consisting of completed, scheduled, and not yet scheduled.

28. The method of claim 21, wherein the execution of the instructions further results in the query server performing the step of assigning a same task to a free task slot on two or more different worker nodes, thereby causing the same task to be redundantly executed.

29. The method of claim 21, wherein the execution of the instructions further results in the query server performing the step of, upon determining that a worker node has failed, blacklisting the failed node such that no further tasks are assigned to task slots on the failed node.

30. The method of claim 29, wherein the execution of the instructions further results in the query server performing the step of reassigning tasks previously assigned to task slots on the failed node to task slots on one or more other worker nodes.

31. The method of claim 21, wherein the query comprises SQL.

32. The method of claim 21, wherein the query plan comprises an operator directed acyclic graph, wherein each operator in the graph comprises a database operation to be performed on data input to that operator, and wherein each parent operator in the graph is dependent upon data produced by one or more child operators.

33. The method of claim 32, wherein the execution of the instructions further results in the query server performing the step of dividing an operator in the query plan into a plurality of tasks, each task for applying the operation associated with the operator to a disjoint subset of data from the database.

34. The method of claim 33, wherein at least one of the tasks is a child task having at least one parent task dependent on subsets of output data produced by the child task.

35. The method of claim 34, wherein the execution of the instructions further results in the query server performing the step of associating annotations with the child task, the annotations comprising a mapping function for allocating the subsets of output data to the at least one parent task.

36. The method of claim 32, wherein the operators comprise one or more of scan, filter, sort, join, comparison, logical, and user-defined operators.

37. In a system comprising a plurality of worker nodes, each worker node having a first memory storing at least a portion of a database and a second memory storing computer executable instructions, a method for performing distributed execution of database queries, the method comprising:

executing the instructions by at least one processing unit, the execution of the instructions resulting in each worker node performing the steps of:

receiving, from a query server, an assignment of a task from a plurality of tasks commonly associated with a database query to be executed on a free task slot of the worker node, wherein the task is assigned to the task slot by the query server and received by the worker node immediately after the task slot becomes available, wherein a respective assignment rate for each worker node is selectively adjusted based on a rate at which each worker node completes assigned tasks;

receiving a notification, from the query server, that input required by a task assigned to a task slot of the worker node is available; and in response to the notification, retrieving the required input from a worker node that produced the required input.

38. The method of claim 37, wherein each worker node comprises a plurality of task slots, each task slot comprising a pool of resources that runs tasks without start-up overhead.

39. The method of claim 37, wherein the execution of the instructions further results in the worker node performing the step of retrieving required input for an assigned task from one of local storage on the worker node and storage on a different worker node.

40. The method of claim 37, wherein the execution of the instructions further results in the worker node performing the step of retaining output created by the completed task until execution of the database query is completed.

* * * * *